United States Patent
Kang et al.

(10) Patent No.: US 10,126,599 B2
(45) Date of Patent: Nov. 13, 2018

(54) PRECURSOR PARTICLE FOR FORMING LIQUID CRYSTAL ALIGNMENT LAYER, LIQUID CRYSTAL DISPLAY PANEL, AND METHOD OF MANUFACTURING THE LIQUID CRYSTAL DISPLAY PANEL

(71) Applicants: Samsung Display Co., Ltd., Yongin, Gyeonggi-Do (KR); INDUSTRIAL COOPERATION FOUNDATION CHONBUK NATIONAL UNIVERSITY, Jeonju-si, Jeollabuk-do (KR)

(72) Inventors: Shin Woong Kang, Jeonju-si (KR); Kwang Un Jeong, Jeonju-si (KR); Byung Wook Ahn, Seoul (KR); Keun Chan Oh, Cheonan-si (KR); Chang Hun Lee, Hwaseong-si (KR)

(73) Assignees: Samsung Display Co., Ltd., Yongin (KR); INDUSTRIAL COOPERATION FOUNDATION CHONBUK NATIONAL UNIVERSITY, Jeonju-si (KR)

( * ) Notice: Subject to any disclaimer, the term of this patent is extended or adjusted under 35 U.S.C. 154(b) by 721 days.

(21) Appl. No.: 14/661,974

(22) Filed: Mar. 18, 2015

(65) Prior Publication Data
US 2016/0154278 A1 Jun. 2, 2016

(30) Foreign Application Priority Data
Dec. 2, 2014 (KR) ........................ 10-2014-0170848

(51) Int. Cl.
G02F 1/1337 (2006.01)
C09K 19/56 (2006.01)
C09K 19/52 (2006.01)

(52) U.S. Cl.
CPC ........ *G02F 1/133711* (2013.01); *C09K 19/52* (2013.01); *C09K 19/56* (2013.01);
(Continued)

(58) Field of Classification Search
CPC . C09K 19/56; C09K 2019/521; G02F 1/1341; G02F 1/133711; G02F 1/133788;
(Continued)

(56) References Cited

U.S. PATENT DOCUMENTS 4,749,590 A * 6/1988 Klingen ................. C09J 7/0217
427/208.4
7,037,443 B2 5/2006 Shuto et al.
(Continued)

FOREIGN PATENT DOCUMENTS

KR 2002-0045547 A 6/2002
KR 10-2014-0001044 A 1/2014

OTHER PUBLICATIONS

Evonik Industries, Safety Data Sheet Aerosil® R7 11, version 4.0/US, Jun. 25, 2015.*

*Primary Examiner* — Sophie Hon
*Assistant Examiner* — Sow Fun Hon
(74) *Attorney, Agent, or Firm* — H.C. Park & Associates, PLC

(57) ABSTRACT

A liquid crystal device that includes two substrates that face each other, a liquid crystal cell interposed between the two substrates, and a liquid crystal alignment layer interposed between the liquid crystal cell and at least one of the two substrates, the liquid crystal alignment layer includes a plurality of spherical or spherical-like core particles having a diameter of 10 nm to 1 μm.

11 Claims, 24 Drawing Sheets
(16 of 24 Drawing Sheet(s) Filed in Color)

(52) U.S. Cl.
CPC .. *G02F 1/133788* (2013.01); *C09K 2019/521* (2013.01); *G02F 2202/36* (2013.01); *Y10T 428/1005* (2015.01)

(58) Field of Classification Search
CPC ........... G02F 2202/36; Y10T 428/1005; Y10T 428/1009; Y10T 428/1014
See application file for complete search history.

(56) References Cited

U.S. PATENT DOCUMENTS

2005/0243264 A1* 11/2005 Sikharulidze .......... B82Y 20/00
    349/177
2010/0091208 A1* 4/2010 Kramer ................. G02F 1/1391
    349/33

* cited by examiner

PRECURSOR PARTICLE FOR FORMING LIQUID CRYSTAL ALIGNMENT LAYER, LIQUID CRYSTAL DISPLAY PANEL, AND METHOD OF MANUFACTURING THE LIQUID CRYSTAL DISPLAY PANEL

CLAIM OF PRIORITY

This application claims priority under 35 U.S.C. § 119 from Korean Patent Application No. 10-2014-0170848 filed on Dec. 2, 2014 in the Korean Intellectual Property Office, the disclosure of which is incorporated herein by reference in its entirety.

BACKGROUND OF THE INVENTION

Field of the Invention

The present invention relates to a liquid crystal display, a precursor particle for forming an alignment layer in the LCD display, and a method of making the LCD display that provides a predetermined tilt angle for the liquid crystals, while avoiding the complications of the process steps used to form earlier alignment layers.

Description of the Related Art

A liquid crystal display (LCD) includes an LCD panel having liquid crystal cell interposed between two substrates that face each other. Since the LCD panel is a non-luminous device, a light source for supplying light to the LCD panel is located behind the LCD panel. The transmittance of light supplied from the light source through the LCD panel is adjusted according to the arrangement of liquid crystals within the liquid crystal cell.

To arrange liquid crystals vertically with respect to a surface of a substrate, a liquid crystal alignment layer is used. The liquid crystal alignment layer is formed by forming a thin layer on the surface of the substrate by coating an organic polymer compound or an inorganic compound, such as silicon oxide, on the surface of the substrate, and then drying and baking the thin layer. Generally, a vertical alignment polyimide thin layer is used as the liquid crystal alignment layer.

However, forming such a polymer-based liquid crystal alignment layer requires a series of processes, such as coating a display panel with a liquid crystal alignment agent made of an organic polymer compound, and then drying and baking the liquid crystal alignment agent at a high temperature. These processes undermine productivity. Therefore, a simpler process of forming a liquid crystal alignment layer is required to improve productivity.

SUMMARY OF THE INVENTION

Aspects of the present invention provide a method of forming a liquid crystal alignment layer in a simplified manner to improve productivity by omitting a series of processes including coating, drying and baking a polymer-based liquid crystal alignment agent.

Aspects of the present invention also provide a liquid crystal display (LCD) panel which can improve the uniformity, stability and reliability of the alignment of liquid crystals.

Aspects of the present invention also provide a precursor particle for forming a liquid crystal alignment layer.

According to one aspect of the present invention, there is provided a liquid crystal display (LCD) panel, including an upper substrate facing a lower substrate, a liquid crystal cell arranged between the upper substrate and the lower substrate and a liquid crystal alignment layer arranged between the liquid crystal cell and at least one of the upper and the lower substrates, the liquid crystal alignment layer including a plurality of spherical or spherical-like core particles having a diameter of 10 nm to 1 μm. The core particles may each have a diameter of 10 to 500 nm. The core particles may each have a diameter of 10 to 200 nm. The core particles may include one of an inorganic oxide and an organic polymer compound. The core particles may include one of silicon oxide, silica, aluminum oxide, polystyrene, polymethyl methacrylate, and polyacrylate. Each of the core particles may include an electron-pair donor on a surface thereof. The electron-pair donor may include at least one functional group selected from hydroxyl group (—OH), an amine group (—N, —NH, —NH$_2$), a thiol group (—SH), an aldehyde group (—COH), and a carboxyl group (—COOH). The liquid crystal alignment layer may also include a $C_3$-$C_{30}$ saturated or unsaturated hydrocarbon. Each of the core particles may have a surface that attaches to at least one $C_3$-$C_{30}$ hydrocarbon substituted by a photopolymerization functional group selected from an acryl group, a methacryl group, a cinnamate group, a coumarin group, a vinyl group, a thiol group, an ene group, a diene group, a thiol-ene group, an acetylene group, an acryloxy group, a methacryloxy group, and combinations of the same.

The liquid crystal alignment layer may also include a photopolymerization functional group that is polymerized by light, the photopolymerization functional group may be bonded to the $C_3$-$C_{30}$ saturated or unsaturated hydrocarbon. The photopolymerization functional group may be one of an acryl group, a methacryl group, a cinnamate group, a cinnamamide group, a maleimide group, a coumarin group, an ene group (—C=C—), a diene group, a thiol-ene group, a chalcone group, and combinations of the same. The photopolymerization functional group and the $C_3$-$C_{30}$ hydrocarbon may be attached to a surface of one of the core particles by at least one linker selected from a group consisting of Si, —C=O—, —COO—, —(SO$_2$)—, —O(SO$_2$)—, —O(SO$_2$)O—, —(P=O)O$_2$— and —O(P=O)O$_2$—, wherein the linker is bonded to the $C_3$-$C_{30}$ saturated or unsaturated hydrocarbon.

According to another aspect of the present invention, there is provided a precursor particle for forming a liquid crystal alignment layer, the precursor particle being represented by P—X—R, where P may be a spherical or spherical-like core particle having a diameter of 10 nm to 1 μm and having a surface introduced with at least one electron pair donor selected from a hydroxyl group (—OH), an amine group (—N, —NH, —NH$_2$), a thiol group (—SH), an aldehyde group (—COH) and a carboxyl group (—COOH), X being at least one linker selected from a group consisting of Si, —C=O—, —COO—, —(SO$_2$)—, —O(SO$_2$)—, —O(SO$_2$)O—, —(P=O)O$_2$— and —O(P=O)O$_2$—, and R being a saturated or an unsaturated hydrocarbon including 3 to 30 carbon atoms. The (R) saturated or unsaturated hydrocarbon including 3 to 30 carbon atoms may be substituted by a photoreactive group selected from an acryl group, a methacryl group, a cinnamate group, a coumarin group, a vinyl group, a thiol group, an ene group, a diene group, a thiol-ene group, an acetylene group, an acryloxy group, a methacryloxy group, and combinations of the same. The core particle may have a diameter of 10 to 500 nm. The core particle may have a diameter of 10 to 200 nm. The core particle P may include one of silicon oxide, silicon dioxide, aluminum oxide, polystyrene, polymethyl methacrylate, and polyacrylate.

According to yet another aspect of the present invention, there is provided a method of manufacturing an LCD panel, including placing an upper substrate and a lower substrate to face each other, forming a liquid crystal composition that includes a plurality of liquid crystals and a plurality of precursor particles represented by P—X—R, where P is a spherical or spherical-like core particle having a diameter of 10 nm to 1 μm and having a surface introduced with at least one electron pair donor selected from a hydroxyl group (—OH), an amine group (—N, —NH, —NH$_2$), a thiol group (—SH), an aldehyde group (—COH) and a carboxyl group (—COOH), X being at least one linker selected from Si, —C=O—, —COO—, —(SO$_2$)—, —O(SO$_2$)—, —O(SO$_2$)O—, —(P=O)O$_2$— and —O(P=O)O$_2$—, and R being a saturated or an unsaturated hydrocarbon including 3 to 30 carbon atoms, and injecting the liquid crystal composition between the upper and the lower substrates. The method may also include irradiating the liquid crystal composition with ultraviolet radiation while applying an electric field to the liquid crystal composition after the injecting, the (R) saturated or unsaturated hydrocarbon may include 3 to 30 carbon atoms that is substituted by a photoreactive group selected from an acryl group, a methacryl group, a cinnamate group, a coumarin group, a vinyl group, a thiol group, an ene group, a diene group, a thiol-ene group, an acetylene group, an acryloxy group, a methacryloxy group, and combinations of the same.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
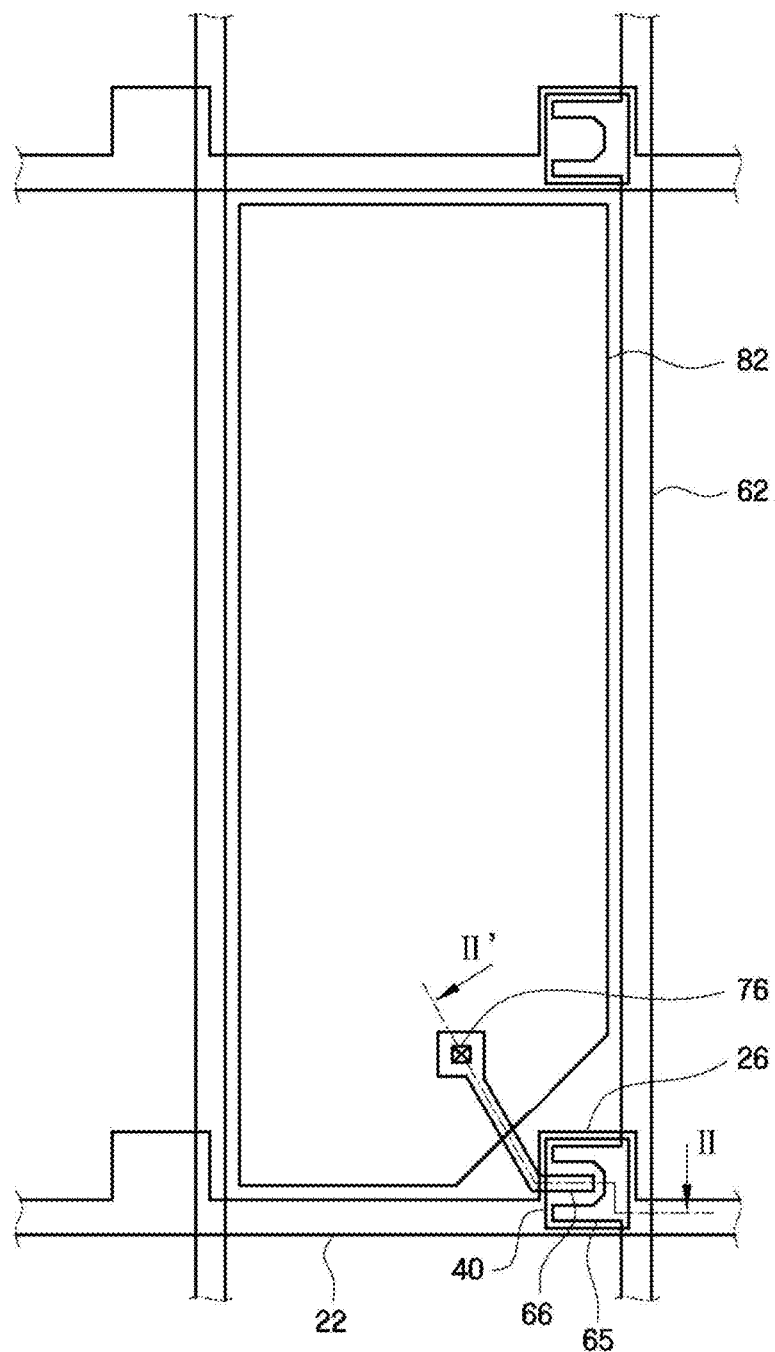
FIG. 1 is a layout view of a liquid crystal display (LCD) panel according to an embodiment of the present invention.

Features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer, or one or more intervening elements or layers may be present. In contrast, when an element is referred to as being "directly on," "directly connected to" or "directly coupled to" another element or layer, there are no intervening elements or layers present. As used herein, connected may refer to elements being physically, electrically, operably, and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration. As used herein, the terms "use," "using," and "used" may be considered synonymous with the terms "utilize," "utilizing," and "utilized," respectively.

Hereinafter, a liquid crystal display (LCD) panel according to an embodiment of the present invention will be described with reference to the attached drawings.

Figure 2:
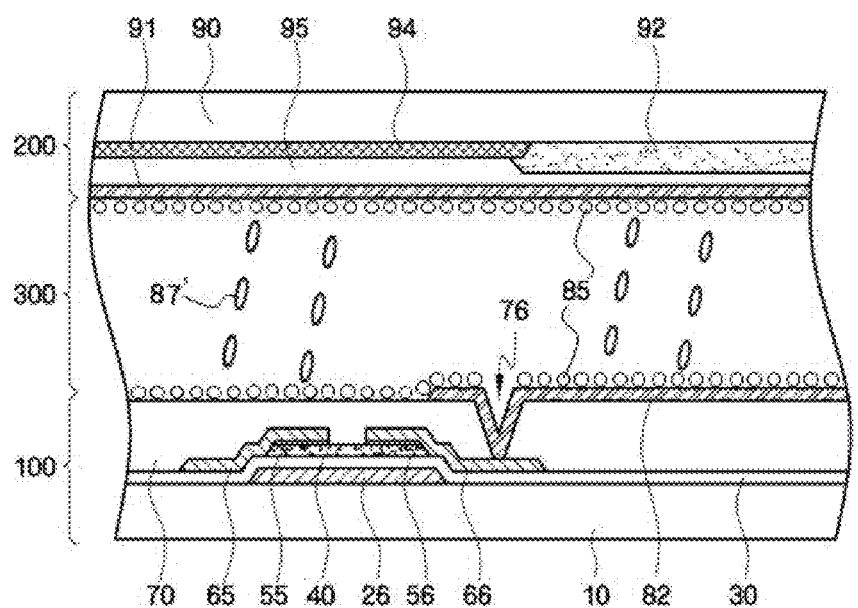
FIG. 2 is a cross-sectional view of the LCD panel taken along the line II-II' of FIG. 1.

Turning now to FIGS. 1 and 2, FIG. 1 is a layout view of an LCD panel according to an embodiment of the present invention, and FIG. 2 is a cross-sectional view of the LCD panel taken along the line II-II' of FIG. 1. Referring now to FIGS. 1 and 2, a lower display panel 100 may include a first transparent insulating substrate 10, a thin-film transistor (26, 30, 40, 55, 56, 65 and 66), a passivation layer 70, and a pixel electrode 82. The upper panel 200 may include a second transparent insulating substrate 90, a black matrix 94, color filters 92, an overcoat layer 95, and a common electrode 91. A liquid crystal cell 300 may be formed between the lower display panel 100 and the upper display panel 200. The liquid crystal cell 300 may include liquid crystals 87'. A plurality of precursor particles 85 are formed on the pixel electrode 82 and the common electrode 91. The precursor particles 85 form a liquid crystal alignment layer.

Each of the first insulating substrate 10 and the second insulating substrate 90 may a transparent glass substrate such as soda lime glass, borosilicate glass or a plastic substrate such as polyethersulfone or polycarbonate. In addition, the first insulating substrate 10 may be, e.g., a flexible substrate made of polyimide Gate wiring (22 and 26) and data wiring (62, 65 and 66) may be formed on the first insulating substrate 10. The gate wiring (22 and 26) includes a gate line 22 and a gate electrode 26. The gate electrode 26 protrudes from the gate line 22. The gate wiring (22 and 26) delivers a gate signal or a gate voltage. The gate wiring (22 and 26) may include aluminum (Al)-based metal such as aluminum and an aluminum alloy, silver (Ag)-based metal such as silver and a silver alloy, copper (Cu)-based metal such as copper and a copper alloy, molybdenum (Mo)-based metal such as molybdenum and a molybdenum alloy, chrome (Cr), titanium (Ti) or tantalum (Ta).

The data wiring (62, 65 and 66) includes a data line 62, a source electrode 65, and a drain electrode 66. The data wiring (62, 65 and 66) delivers a data signal or a data voltage. The data wiring (62, 65 and 66) may include chrome, molybdenum-based metal, or refractory metal such as tantalum and titanium.

Referring now to FIG. 1, the gate line 22 extends in a horizontal direction, and the data line 62 extends in a vertical direction to intersect the gate line 22.

Although each pixel may be connected to only one gate line 22, the pixel electrode 82 is arranged in an area surrounded by two adjoining gate lines 22 and two adjoining data lines 62. The pixel electrode 82 may contact the drain electrode 66 through a contact hole 76.

A gate insulating layer 30 including silicon nitride (SiNx) may be formed on the gate wiring (22 and 26). A semiconductor layer 40 may be formed on the gate insulating layer 30 and may include hydrogenated amorphous silicon or polycrystalline silicon.

Ohmic contact layers 55 and 56 may be formed on the semiconductor layer 40, and the source electrode 65 and the drain electrode 66 may be formed on the ohmic contact layers 55 and 56 respectively and on portions of the gate insulating layer 30. The ohmic contact layers 55 and 56 may include a material such as silicide or n+ hydrogenated amorphous silicon heavily doped with n-type impurities. The ohmic contact layers 55 and 56 are disposed between the semiconductor layer 40 thereunder and the source electrode 65 and the drain electrode 66 arranged thereon to reduce a contact resistance between the semiconductor layer 40 and ones of the source and drain electrodes 65 and 66. The ohmic contact layers 55 and 56 may be located on the semiconductor layer 40 to be separated from each other, and the semiconductor layer 40 may be partially exposed between the ohmic contact layers 55 and 56.

The source electrode 65 overlaps at least part of the semiconductor layer 40, and the drain electrode 66 faces the source electrode 65 with respect to the gate electrode 26 and overlaps at least part of the semiconductor layer 40. In other words, the source electrode 65 and the drain electrode 66 are separated from each other, and a portion of the semiconductor layer 40 is exposed between the source electrode 65 and the drain electrode 66.

The passivation layer 70 is formed on the data wiring (62, 65 and 66) and the exposed portion of the semiconductor layer 40. The passivation layer 70 may include an inorganic material such as silicon nitride or silicon oxide, organic material having photosensitivity and superior planarization characteristics, or a low-k insulating material (such as a-Si:C:O or a-Si:O:F) formed by plasma enhanced chemical vapor deposition (PECVD).

In addition, the passivation layer 70 may have a double-layer structure composed of a lower inorganic layer and an upper organic layer in order to protect the exposed portion of the semiconductor layer 40, while taking advantage of the superior characteristics of the organic layer. Further, the passivation layer 70 may be a red, green or blue color filter layer.

The contact hole 76 is formed in the passivation layer 70. The pixel electrode 82 is formed on the passivation layer 70 and is physically and electrically connected to the drain electrode 66 by the contact hole 76. Accordingly, the pixel electrode 82 receives a data voltage and a control voltage from the drain electrode 66.

The pixel electrode 82, to which a data voltage has been applied, generates an electric field together with the common electrode 91 of the upper display panel 200, thereby determining the arrangement of the liquid crystals 87' arranged between the common electrode 91 and the pixel electrode 82.

The black matrix 94 is arranged on the second insulating substrate 90 to prevent the leakage of light and to define a pixel area. The black matrix 94 may include metal (metal oxide), such as chrome or chrome oxide, or organic black resist. The black matrix 94 may be formed in portions corresponding to the gate line 22, the data line 62 and a portion corresponding to the thin-film transistor. The black matrix 94 may have various shapes in order to prevent the leakage of light in an area around the pixel electrode 82 and the thin-film transistor.

The red, green and blue color filters 92 may be arranged sequentially in the pixel area defined by the black matrix 94. The overcoat layer 95 may be formed on the color filters 92 in order to planarize a step between the color filters 92 and the black matrix 94.

The common electrode 91 is formed on the overcoat layer 95. The common electrode 91 includes a transparent conductive material such as indium tin oxide (ITO) or indium zinc oxide (IZO) in order to allow an image produced by the liquid crystal cell 300 to pass through and be viewed from an outside. The common electrode 91 is placed to face the pixel electrode 82, and the liquid crystal cell 300 is interposed between the common electrode 91 and the pixel electrode 82.

The liquid crystals 87' are pretilted with respect to a surface of the lower display panel 100 and a surface of the upper display panel 200. The liquid crystals 87' are pretilted by the liquid crystal alignment layer composed of the precursor particles 85 formed on the pixel electrode 82 and the common electrode 91. The precursor particles 85 will now be described in detail with reference to FIG. 3.

Figure 3:
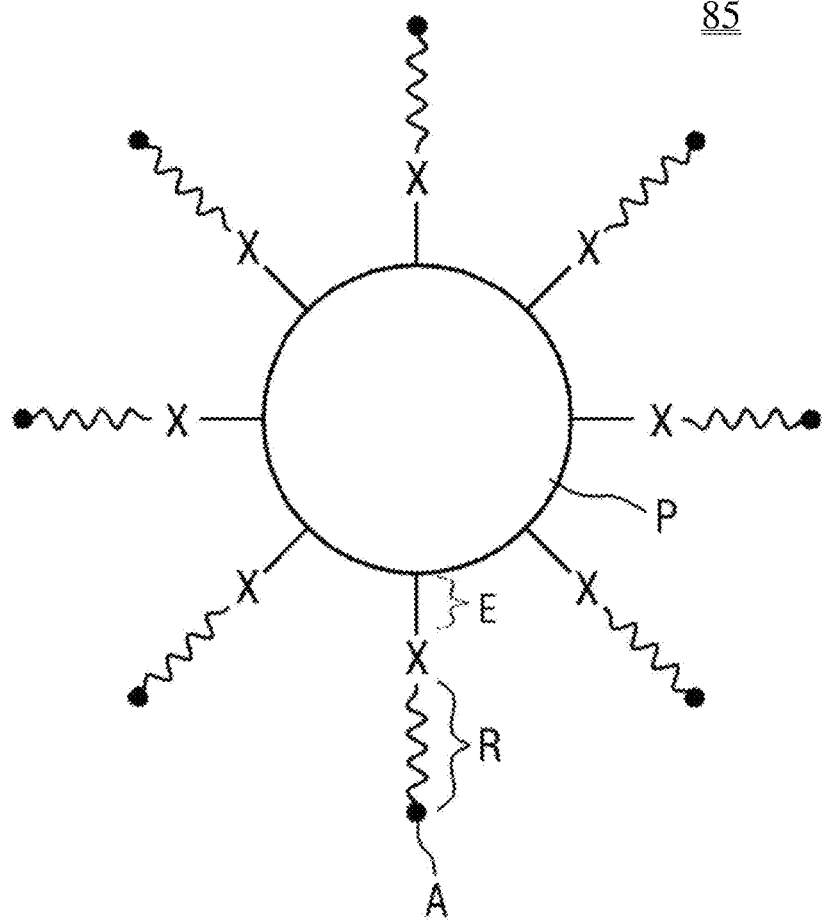
FIG. 3 illustrates the structure of a precursor particle for forming a liquid crystal alignment layer according to a first embodiment of the present invention.

Referring now to FIG. 3, a precursor particle 85 may have a structure in which a spherical or spherical-like core particle P with a diameter to 10 nm to 1 μm has a surface modified with a photoreactive organic group (R-A).

The core particle P may include an organic material, an inorganic material, an organic/inorganic compound, or any mixture of the same. In a nonrestrictive example, the core particle P may include an inorganic oxide, such as silicon oxide, silicon dioxide (silica) and aluminum oxide, or an organic polymer compound, such as polystyrene, polymethyl methacrylate or polyacrylate.

Vertical alignment characteristics of liquid crystals greatly depend on the size and shape of the core particle P. Therefore, the spherical or spherical-like core particle P made out of an inorganic material, inorganic oxide or an organic polymer compound may have a diameter of 10 nm to 1 μm.

The core particle P having a diameter of less than 10 nm may not easily adhere to a substrate surface and may be less capable of vertically aligning liquid crystals. Therefore, an effective amount of core particles P needed to induce the vertical alignment of liquid crystals is increased, making it difficult to uniformly disperse the core particles P.

The core particle P having a diameter of more than 1 μm may cause a defect, such as leakage of light due to light scattering and liquid crystal arrangement around the core particle P. In addition, if the diameter of the core particle P exceeds 1 μm, the density of the core particles P may be different on the surfaces of the upper and lower display panels 200 and 100 due to the effect of gravity. Therefore, the core particle P having a diameter of more than 1 μm is not suitable for inducing the vertical alignment of liquid crystals.

The diameter of the core particle P may be in a range of 10 nm to 500 μm in view of surface adhesion and adhesion stability. If the diameter of the core particle P exceeds 500 nm, the adhesion stability of the core particle P may be reduced by, for example, the movement of the core particle P. In order to minimize the difference in size between the core particles P, the diameter of the core particles P may be in a range of 50 to 200 nm.

For the introduction of the photoreactive organic group R-A, an electron pair donor E, such as a hydroxyl group (—OH), an amine group (—N, —NH, —NH$_2$), a thiol group (—SH), an aldehyde group (—COH) or a carboxyl group (—COOH), may be introduced onto the surface of the core particle P.

In addition, a linker X may be introduced to connect the core particle P having the electron pair donor E to the photoreactive organic group R-A. In a nonrestrictive example, the linker X may be Si, —C=O—, —COO—, —(SO$_2$)—, —O(SO$_2$)—, —O(SO$_2$)O—, —(P=O)O$_2$— or —O(P=O)O$_2$—.

The photoreactive organic group R-A is designed to induce photoreaction of the core particle P and to stabilize the alignment of the liquid crystals 87' by pretilting the liquid crystals 87'. In a nonrestrictive example, the photoreactive organic group R-A may have a structure in which a photopolymerization functional group A is bonded to a C$_3$-C$_{30}$ saturated or unsaturated hydrocarbon R. The photopolymerization functional group A may be an acryl group, a methacryl group, a cinnamate group, a cinnamamide group, a maleimide group, a coumarin group, an ene group (—C=C—), a diene group, a thiol-ene group, a chalcone group, or any combination of the same.

For example, if the core particle P is a spherical silica particle having a diameter of 10 nm, 80 nm, 138 nm, 235 nm, 320 nm, 540 nm or 960 nm, the surface of the core particle P may be modified by the photoreactive organic group R-A as follows.

In order to produce the precursor particles 85, the spherical silica particles having a diameter of 10 nm, 80 nm, 138 nm, 235 nm, 320 nm, 540 nm or 960 nm are dispersed in an anhydrous toluene solvent. Then, trimethoxy silypropyl methacrylate and triethyl amine are added to the anhydrous toluene solvent having the spherical silica particles. The resultant mixture is allowed to react at room temperature for 24 hours under slow stifling.

After the reaction, the fine particles modified by a dodecyl silyl group are separated from the solvent using a centrifuge. To separate an unreacted compound from the fine particles, a process of dispersing the fine particles using an excess of anhydrous toluene and anhydrous chroloform and separating the fine particles using the centrifuge is performed three times.

Finally, the separated fine particles are dried in an anhydrous environment to obtain fine particles having a surface modified by the photoreactive organic group R-A.

Each of the precursor particles 85 may be represented by formula (1):

P—X—R, (1)

wherein P is a spherical or spherical-like core particle having a diameter of 10 nm to 1 μm and having a surface introduced with one or more electron pair donors (see 'E' of FIG. 3) selected from hydroxyl group (—OH), an amine group (—N, —NH, —NH$_2$), a thiol group (—SH), an aldehyde group (—COH) and a carboxyl group (—COOH), X is one or more linkers selected from Si, —C=O—, —COO—, —(SO$_2$)—, —O(SO$_2$)—, —O(SO$_2$)O—, —(P=O)O$_2$— and —O(P=O)O$_2$—, and R is a saturated or an unsaturated hydrocarbon including 3 to 30 carbon atoms that is substituted with a photoreactive group (see 'A' of FIG. 3) selected from an acryl group, a methacryl group, a cinnamate group, a coumarin group, a vinyl group, a thiol group, an ene group, a diene group, a thiol-ene group, an acetylene group, an acryloxy group, a methacryloxy group, and combinations of the same.

Figure 4:
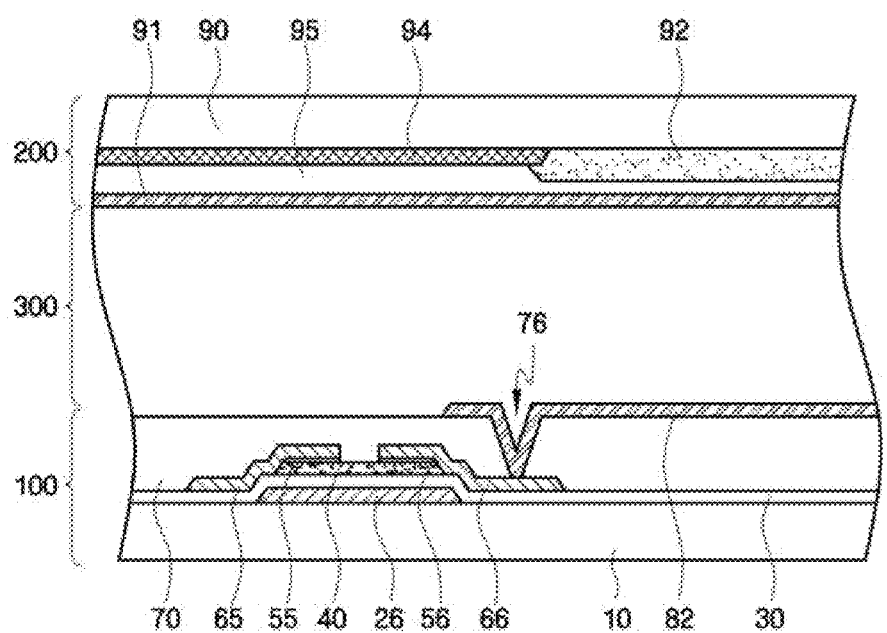
FIGS. 4 and 5 are cross-sectional views illustrating a process of forming the LCD panel of FIG. 2.
Figure 5:
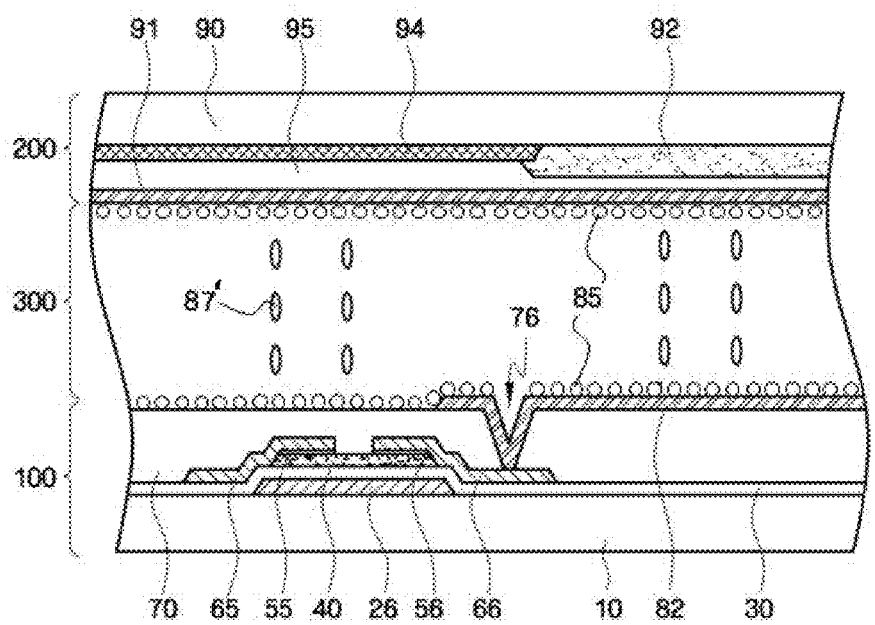

Turning now to FIGS. 4 and 5, FIGS. 4 and 5 are cross-sectional views illustrating a process of forming the LCD panel of FIG. 2. In FIG. 4, the lower display panel 100 and the upper display panel 200 are placed to face each other. In this state, 0.05 to 1.0 parts by weight of the precursor particles 85 are uniformly mixed with 100 parts by weight of the liquid crystals 87'. The resultant mixture is injected between the lower display panel 100 and the upper display panel 200 of FIG. 4 without an alignment layer formation process. The precursor particles 85 are then adsorbed onto the liquid crystal layer/electrode interfaces due to interfacial tension. Adsorption of the precursor particles 85 results in interfacial energy being lowered, and thus the interfaces become more stable as per the Pickering effect. As a result, a liquid crystal alignment layer composed of the precursor particles 85 is formed on the pixel electrode 82 and the common electrode 91, and the liquid crystals 87' are aligned such that directors of the liquid crystals 87' are perpendicular to the upper and lower display panels 100 and 200, as illustrated in FIG. 5.

The above process overcomes the need for a polymer alignment layer formation process needed in the manufacture of a conventional vertical alignment device. Thus, a vertical alignment device can be manufactured only by injecting a mixture of liquid crystals and fine particles between upper and lower substrates. Consequently, this results in process simplification, which, in turn, saves costs and enhances productivity.

Here, if the core particles P are used in less than 0.05 parts by weight, it is difficult to induce uniform vertical alignment of the liquid crystals 87' because the core particles P cannot properly induce vertical alignment of the liquid crystals 87'. On the other hand, if the core particles P are used in more than 1.0 part by weight, a defect may be generated due to the agglomeration of the core particles P.

Next, under the application of an electric field, the LCD panel of FIG. 5 is irradiated with ultraviolet (UV) light at an intensity of 50 μW/cm² to 500 mW/cm². Accordingly, the liquid crystals 87' pretilt as illustrated in FIG. 2, thus achieving surface stabilization of the arrangement state of the liquid crystals 87'.

The surface stabilization makes it possible to induce multiple pretilt angles in each pixel and improve optical and electro-optic characteristics of a liquid crystal device by minimizing defects generated during device driving while improving response speed. In addition, the surface stabilization can improve productivity by omitting a conventional alignment layer formation process.

Further, there is no need to mix a photoreactive monomer compound with the liquid crystals 87' in order for direct stabilization, and it is possible to remove side effects (e.g., non-uniformity of device characteristics due to non-uniformity of a polymer network, reduced reliability due to the remaining unreacted monomers, etc.) created when the photoreactive monomer compound forms a polymer network through photopolymerization.

Figure 6:
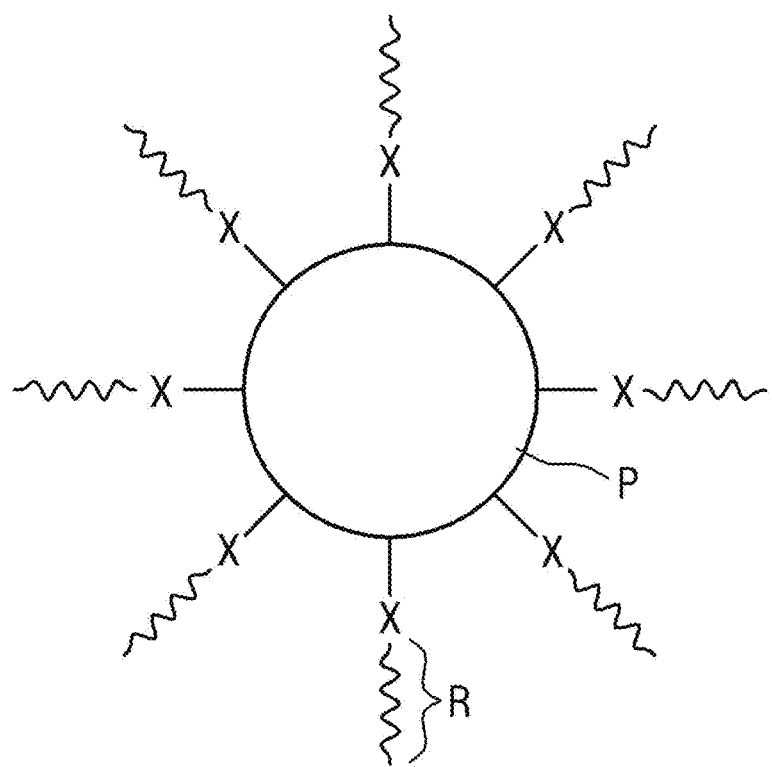
FIG. 6 illustrates the structure of a precursor particle for forming a liquid crystal alignment layer according to a second embodiment of the present invention.

Turning now to FIG. 6, FIG. 6 illustrates the structure of a precursor particle 85' for forming a liquid crystal alignment layer according to a second embodiment of the present invention. The precursor particle 85' of FIG. 6 is different from the precursor particle 85 of FIG. 5 in that a surface of a core particle P is modified with a liquid crystal-affinitive organic group R, and are different from the precursor particle 85 of FIG. 3 in that precursor particle 85' of FIG. 6 lacks photopolymerization functional group A of FIG. 3.

The liquid crystal-affinitive organic group R is designed to improve dispersion of the core particle P within the liquid crystals 87'. In a nonrestrictive example, the liquid crystal-affinitive organic group R may include $C_3$-$C_{30}$ saturated or unsaturated hydrocarbon.

For example, if the core particle P is a spherical silica particle having a diameter of 10 nm, 80 nm, 138 nm, 235 nm, 320 nm, 540 nm or 960 nm, the surface of the core particle P may be modified with the liquid crystal-affinitive organic group R as follows.

The spherical silica particle having a diameter of 10 nm, 80 nm, 138 nm, 235 nm, 320 nm, 540 nm or 960 nm is dispersed in an anhydrous toluene solvent. Then, trimethoxy dodecyl silane and triethyl amine are added to the anhydrous toluene solvent having the spherical silicon particle. The resultant mixture is allowed to react at room temperature for 24 hours under slow stirring.

After the reaction, the fine particle surface-modified by a dodecyl silyl group is separated from the solvent using a centrifuge. To separate an unreacted compound from the fine particle, a process of dispersing the fine particle using an excess of anhydrous toluene and anhydrous chroloform and separating the fine particle using the centrifuge is performed three times. Finally, the separated fine particle is dried in an anhydrous environment to obtain a fine particle having a surface introduced with the liquid crystal-affinitive organic group R. When added to the liquid crystals 87', the liquid crystals 87' can be aligned vertically.

The above-described simplified vertical alignment method and the polymer surface stabilization technology using reactive mesogen can be combined to improve electro-optic characteristics required for device operation.

To this end, a mixture of the liquid crystals 87', the precursor particles 85', and photoreactive monomer organic matter may be prepared. The mixture may be injected into the liquid crystal cell 300 to induce vertical alignment of the liquid crystals 87' without an alignment layer formation process. In addition, the surface stabilization of the liquid crystal arrangement state may be achieved by irradiating UV light with an intensity of 50 μW/cm² to 500 mW/cm² under the application of an electric field.

Here, a mixture of 0.05 to 1.0 parts by weight of the precursor particles 85, 0.01 to 1.0 parts by weight of reactive mesogen, and 100 parts by weight of the liquid crystals 87' may be used. The surface stabilization makes it possible to induce multiple pretilt angles in each pixel and improve optical and electro-optic characteristics of a liquid crystal device by minimizing defects created during device driving while improving response speed. In addition, the surface stabilization can improve productivity by omitting a conventional alignment layer formation process.

Figure 7:
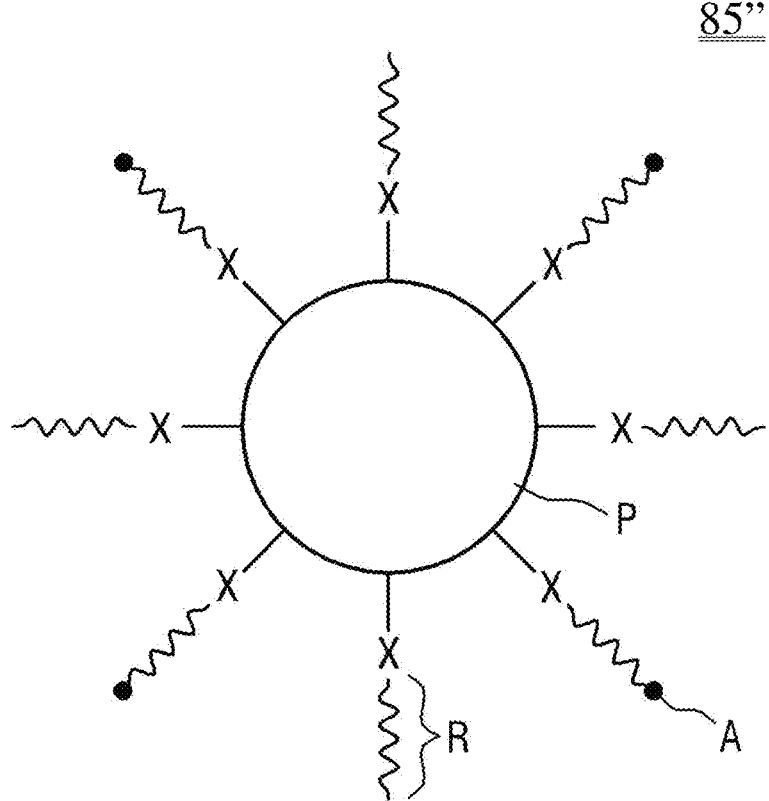
FIG. 7 illustrates the structure of a precursor particle for forming a liquid crystal alignment layer according to a third embodiment of the present invention.

Turning now to FIG. 7, FIG. 7 illustrates the structure of a precursor particle 85" for forming a liquid crystal alignment layer according to a third embodiment of the present invention. The precursor particle 85" of FIG. 7 is different from the precursor particle 85 of FIG. 5 or the precursor particle 85' of FIG. 6 in that a surface of a core particle P is modified with a liquid crystal-affinitive organic group R and a photoreactive organic group A.

The precursor particle 85" of FIG. 7 uses trimethoxy dodecyl silane and trimethoxy silylpropyl methacrylate as a silane coupling agent. The precursor particle 85" of FIG. 7 can be obtained using the same method as the surface-modification method used for the precursor particle 85' of FIG. 6.

Hereinafter, the present invention will be described in greater detail by way of 6 Examples and a comparative examples, but the present invention is not limited to the embodiments.

COMPARATIVE EXAMPLE

The following experiment was conducted to identify the vertical alignment effect of a liquid crystal composition in which fine particles having a diameter of approximately 2 nm and a surface bonded with an organic compound group having high affinity to liquid crystals were dispersed.

First, fine particles, in which isobutyl and methyl methacrylate were bonded to a surface of silsesquioxane having a diameter of approximately 2 nm, were used. 0.3 parts by weight of the fine particles having a diameter of approximately 2 nm and surface-modified with the liquid crystal-affinitive compound were evenly dispersed in 100 parts by weight of a liquid crystal mixture having negative dielectric anisotropy. The resultant mixture was injected between two substrates that maintained a gap of 10.0 μm therebetween. Here, an inner surface of each of the substrates was not treated with an alignment agent typically used for vertical alignment of liquid crystals. That is, the substrates used were without an alignment layer.

Figure 8:
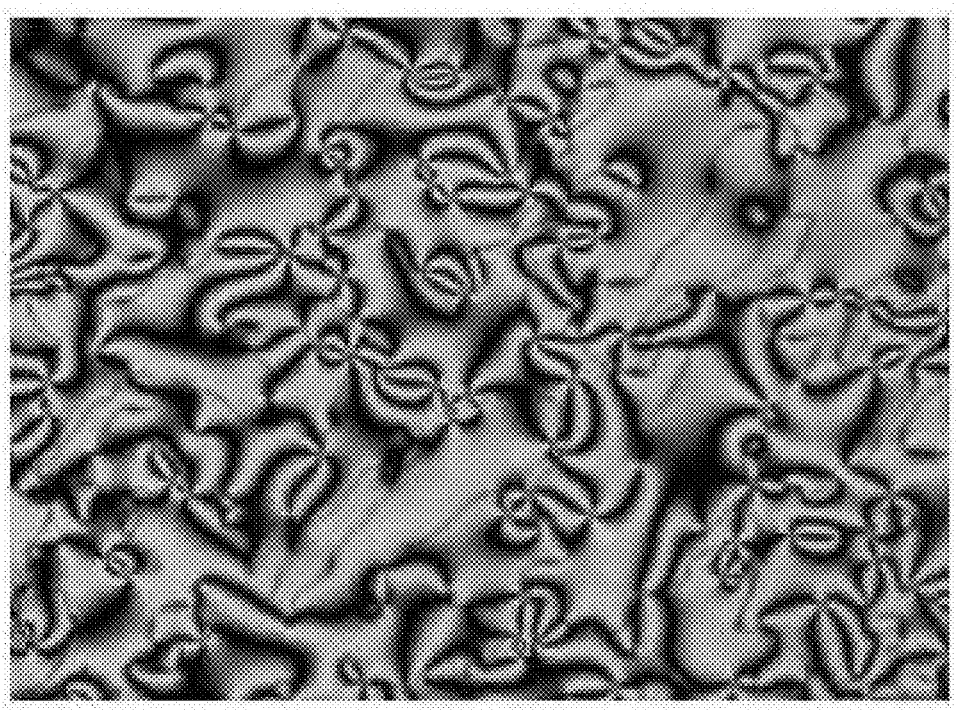
FIGS. 8 through 10 are polarizing microscopic images of an LCD panel according to a Comparative Example under an orthogonal polarizer.

After the injection of the mixture, the alignment state of liquid crystals in a device was observed using a polarizing microscope by rotating a sample. As a result, it was found that the vertical alignment of the liquid crystals was not induced. In this case, the liquid crystals were horizontally aligned in a random manner as shown in FIG. 8.

Figure 9:
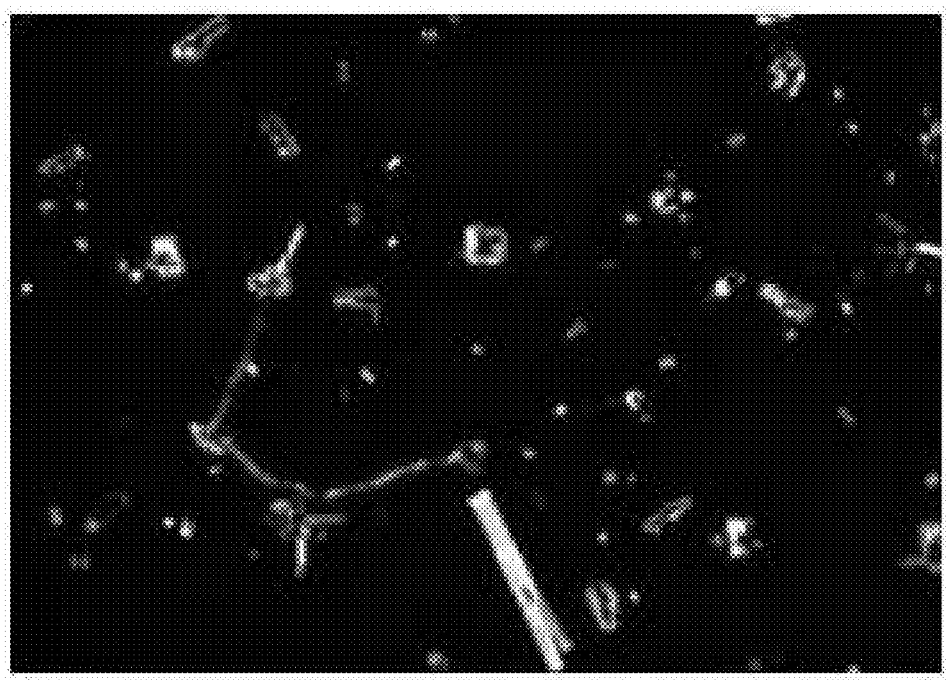

To identify the liquid crystal alignment state of the liquid crystal composition added with more fine particles, 3.0 parts by weight of the same fine particles were dispersed in 100 parts by weight of a liquid crystal mixture having negative dielectric anisotropy. After the injection of the resultant mixture, the alignment state of liquid crystals in a device was observed using a polarizing microscope by rotating a sample. As a result, it was found that the alignment state of the liquid crystals was a light extinction state in which no light was allowed to pass regardless of a rotation angle, as shown in FIG. 9.

In addition, the distribution of optical axes of the liquid crystals was measured using a conoscope. As a result, it was identified that a vertical alignment device having the optical axes of the liquid crystals arranged vertically to the substrate surface was manufactured. In this case, however, many defects were generated by the agglomeration of the fine particles as shown in FIG. 9. The defects degraded optical characteristics of the device.

Figure 10:
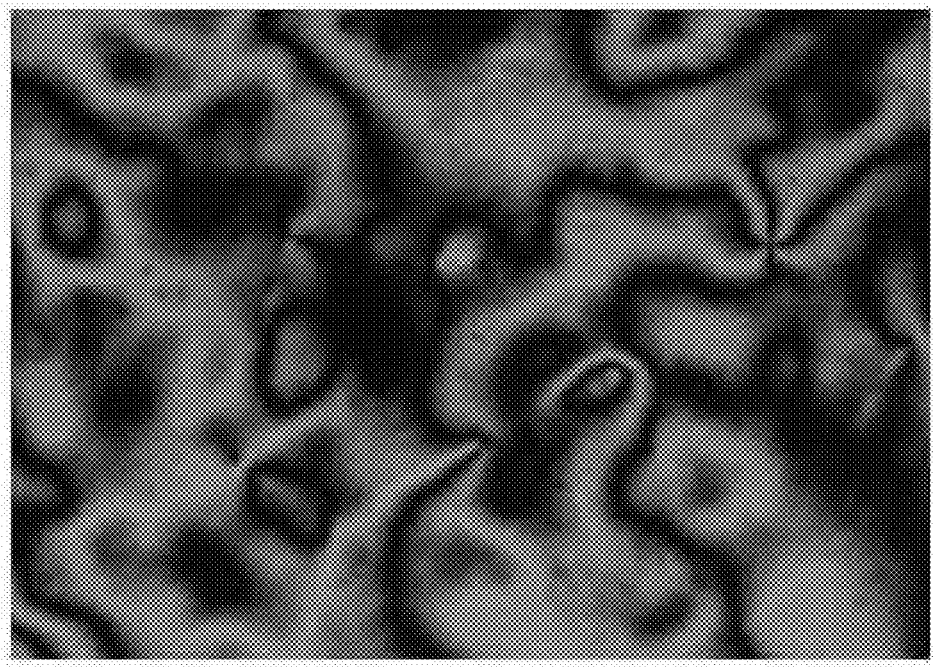

Further, thermal characteristics of induced vertical alignment were not superior. The alignment state of the liquid crystals with respect to temperature was observed by applying heat to the sample in a state where the liquid crystals were induced to be vertically aligned at room temperature (FIG. 9). As a result, it was identified that the alignment state of the liquid crystals was changed to horizontal alignment at about 40° C., and became a completely random horizontal alignment state at 54° C. as shown in FIG. 10.

As apparent from the above results, if fine particles are excessively small in size and have an excessively high solubility in liquid crystals, their effect of inducing vertical alignment of the liquid crystals is reduced, and thermal stability of alignment is also reduced. Thus, the fine particles cannot serve the purpose of the present invention.

EXAMPLE 1

The following experiment was conducted to identify the vertical alignment effect and alignment stabilization effect of organic polymer and inorganic fine particles that were surface-modified by bonding a non-photoreactive organic compound having high affinity to liquid crystals to the surface of the fine particles so as to increase the dispersion of the fine particles.

First, spherical fine silica particles having a diameter of 138 nm were prepared. A hydroxyl group (—OH group) of the silica surface was made to react with trichlorododecyl silane in an anhydrous toluene solvent as in the above surface-modification method to produce fine silica particles having a surface introduced with a dodecylsilyl group. Then, 0.3 parts by weight of the spherical fine silica particles (having a diameter of 138 nm and surface-modified with the liquid crystal-affinitive compound) were evenly dispersed in 100 parts by weight of a liquid crystal mixture having negative dielectric anisotropy. Here, the surface modification of the fine particles significantly improved the uniformity of particle dispersion. The resultant mixture was injected between two substrates that maintained a gap of 10.0 μm therebetween. Here, an inner surface of each of the substrates was not treated with an alignment agent typically used for vertical alignment of liquid crystals. That is, the substrates used were without an alignment layer.

Figure 11:
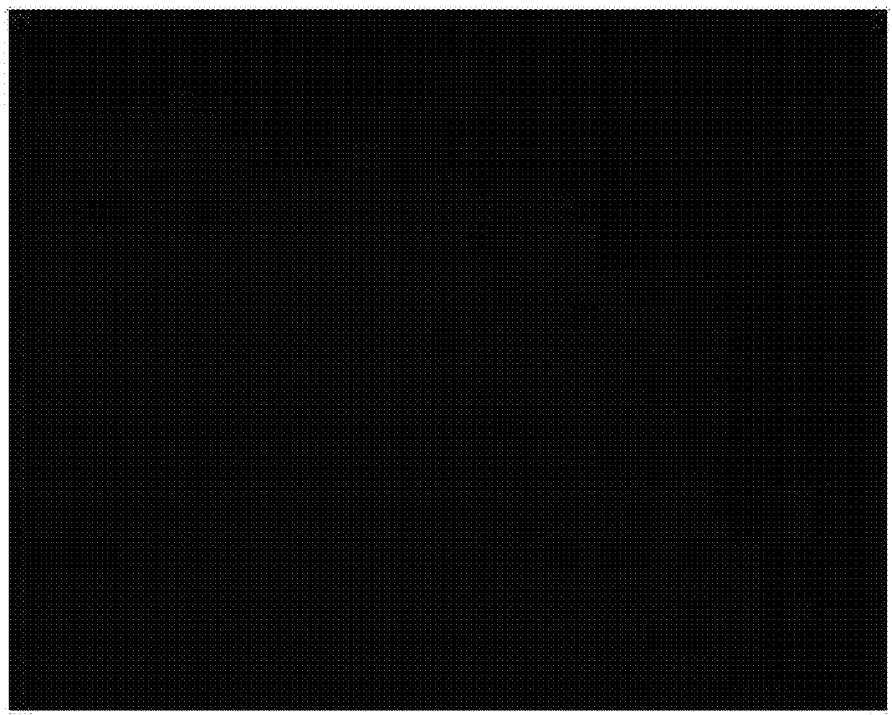
FIG. 11 is a polarizing microscopic image of an LCD panel according to Example 1 under an orthogonal polarizer.

After the injection of the resultant mixture, the alignment state of liquid crystals in a device was observed using a polarizing microscope by rotating a sample. As a result, it was found that the alignment state of the liquid crystals was a light extinction state in which no light was allowed to pass regardless of a rotation angle, as shown in FIG. 11.

Figure 12:
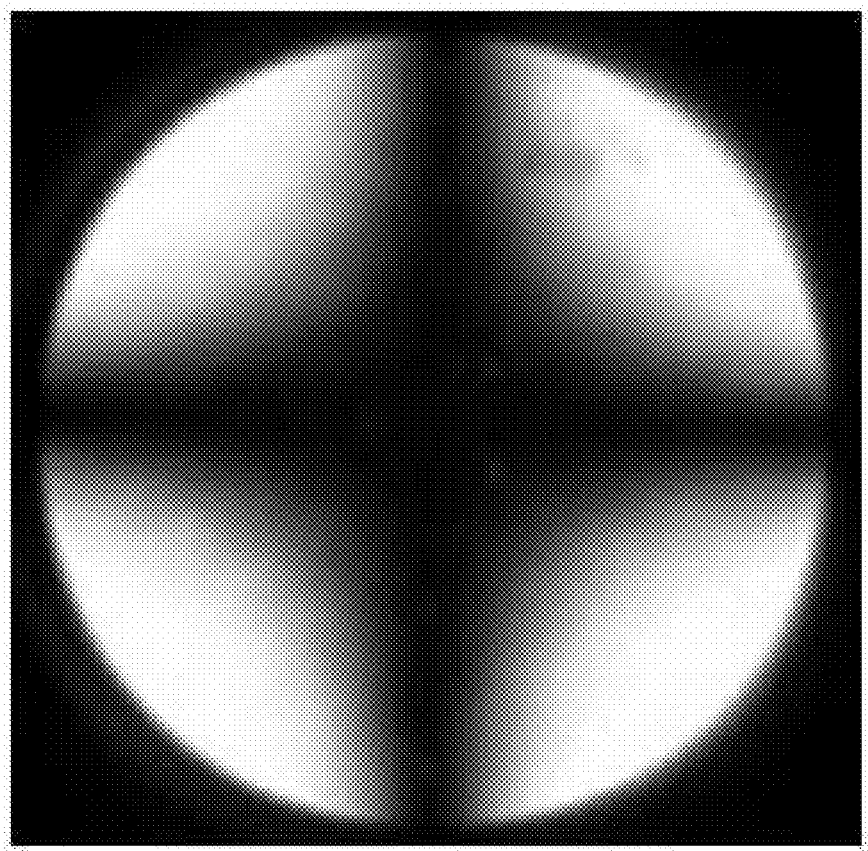
FIG. 12 is a conoscopic image of FIG. 11.

In addition, the distribution of optical axes of the liquid crystals was measured using a conoscope. As a result, it was identified that a vertical alignment device having the optical axes of the liquid crystals uniformly arranged vertically to the substrate surface was manufactured (FIG. 12).

However, it was identified that many defects were generated during the application of an electric field, but gradually disappeared over time to produce a uniformly bright state. This indicated that the vertical alignment state of the liquid crystals induced by the fine particles did not have a pretilt angle in a particular direction, thus degrading electro-optic characteristics of the device. In the uniformly bright state induced by the application of the electric field, UV light having a wavelength of 365 nm was irradiated at an intensity of 1.0 mW/cm$^2$ for 30 minutes, and then the electro-optic characteristics of the liquid crystal device were observed. As a result, it was found that the liquid crystal device showed the same electro-optic characteristics as before the irradiation of the UV light. As apparent from the above results, fine particles surface-modified with a non-photoreactive compound can effectively induce vertical alignment of liquid crystals, but does not have a function of stabilizing a pretilt angle of liquid crystals in a particular direction.

EXAMPLE 2

Fine particles were surface-modified, and a liquid crystal device was manufactured in the same way as in Example 1, except that spherical silica particles having a diameter of 10 nm, 80 nm 235 nm, 320 nm, 540 nm or 960 nm were used. Then, alignment characteristics of liquid crystals were evaluated. As a result, it was found that the uniformity of dispersion improved greatly when the fine particles were dispersed in the liquid crystals as in Example 1. It was also found that uniform vertical alignment was achieved without a treatment process with an alignment agent typically used for vertical alignment of liquid crystals.

However, it was found that the fine particles surface-modified with a non-photoreactive compound as in Example 1 did not have a function of stabilizing a pretilt angle of liquid crystals in a particular direction.

EXAMPLE 3

Fine particles were surface-modified, and a liquid crystal device was manufactured in the same way as in Example 1, except that trimethoxysilylpropyl methacrylate having a photopolymeric methacrylate group as a compound for surface modification was used. Then, alignment characteristics of liquid crystals were evaluated.

First, spherical fine silica particles having a diameter of 138 nm and surface-modified with the photoreactive compound were prepared. 0.3 parts by weight of the fine particles were evenly dispersed in 100 parts by weight of a liquid crystal mixture having negative dielectric anisotropy. The resultant mixture was injected between two substrates which were not treated with an alignment agent and maintained a gap of 10.0 μm therebetween.

Figure 13:
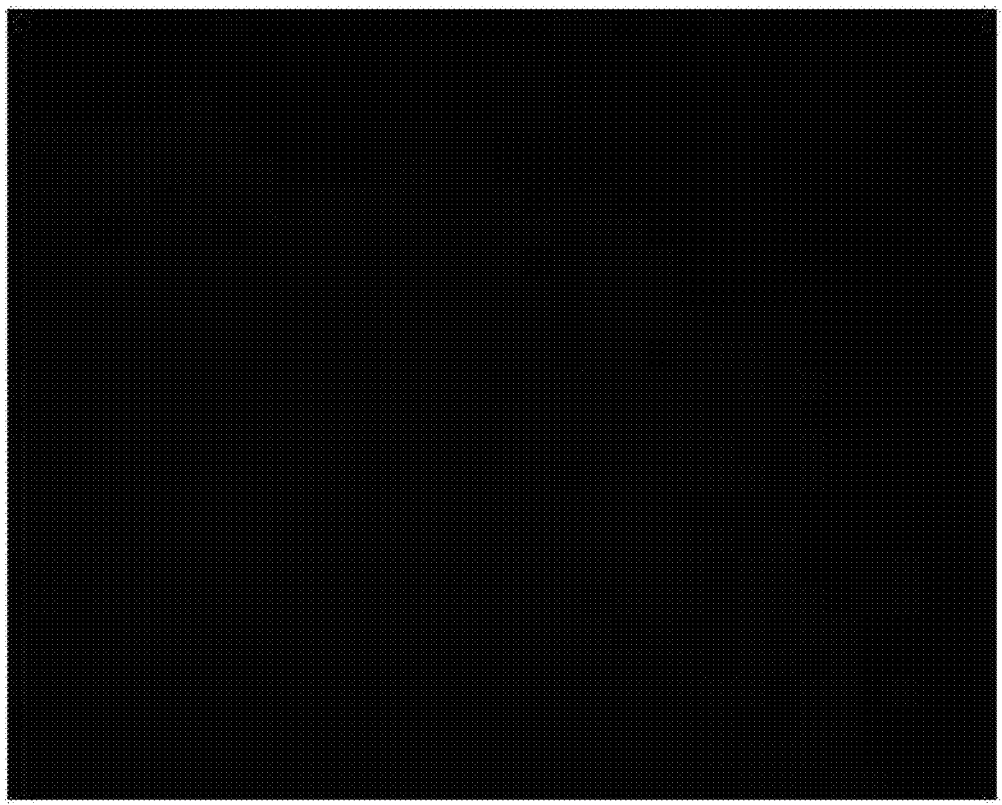
FIG. 13 is a polarizing microscopic image of an LCD panel according to Example 3 under an orthogonal polarizer.

An LCD manufactured thusly was observed using a polarizing microscope, and the result is shown in FIG. 13. In addition, the arrangement of liquid crystal molecules was observed using a conoscopic image, and the result is shown in FIG. 14.

Figure 14:
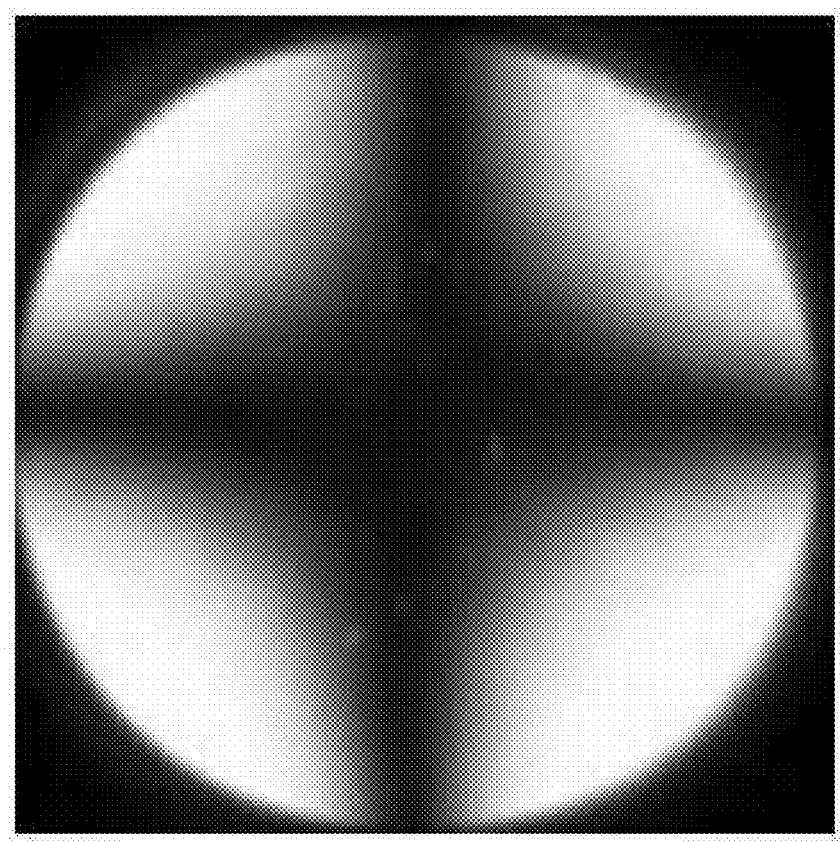
FIG. 14 is a conoscopic image of FIG. 13.

As shown in FIGS. 13 and 14, a liquid crystal cell of the manufactured LCD was in a complete light extinction state under an orthogonal polarizer, and the liquid crystal molecules were arranged vertically to the substrate surface in the conoscopic image.

In addition, an electric field was applied to the LCD at an intensity corresponding to T80 (80% of maximum transmittance), and then the alignment of the liquid crystal molecules was observed. Generally, a liquid crystal cell aligned vertically to a substrate is in a light extinction state under an orthogonal polarizer as shown in FIG. 13. In this state, if an electric field is applied to the liquid crystal cell, liquid crystal molecules rotate in a direction perpendicular to the electric field, thereby increasing transmittance.

However, if the liquid crystal molecules do not form a pretilt angle in a particular direction, they rotate in a random direction in each part of the liquid crystal cell. This causes a lot of liquid crystal arrangement defects, thus degrading characteristics of the LCD device. However, it was observed that defects generated at the initial stage of voltage application slowly disappeared over time to produce a uniformly bright state.

Additionally, in the uniformly bright state, UV light having a wavelength of 365 nm was irradiated at an intensity of 1.0 mW/cm$^2$ for 30 minutes, and then electro-optic characteristics of the liquid crystal device were observed.

Figure 15:
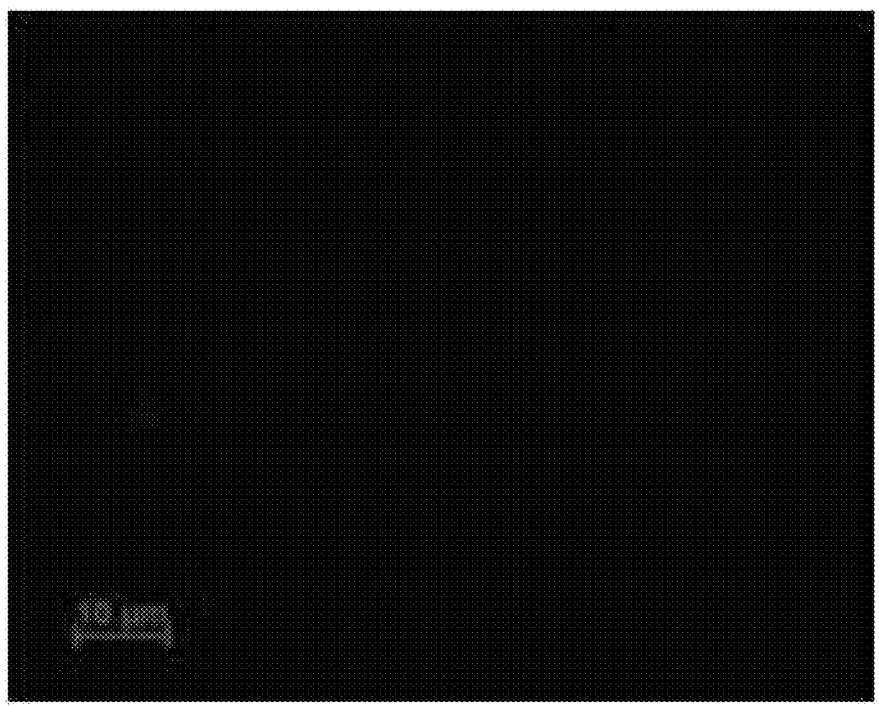
FIG. 15 is a polarizing microscopic image of the LCD panel according to Example 3 under the orthogonal polarizer after photo-stabilization by ultraviolet (UV) light irradiation and before voltage application.
Figure 16:
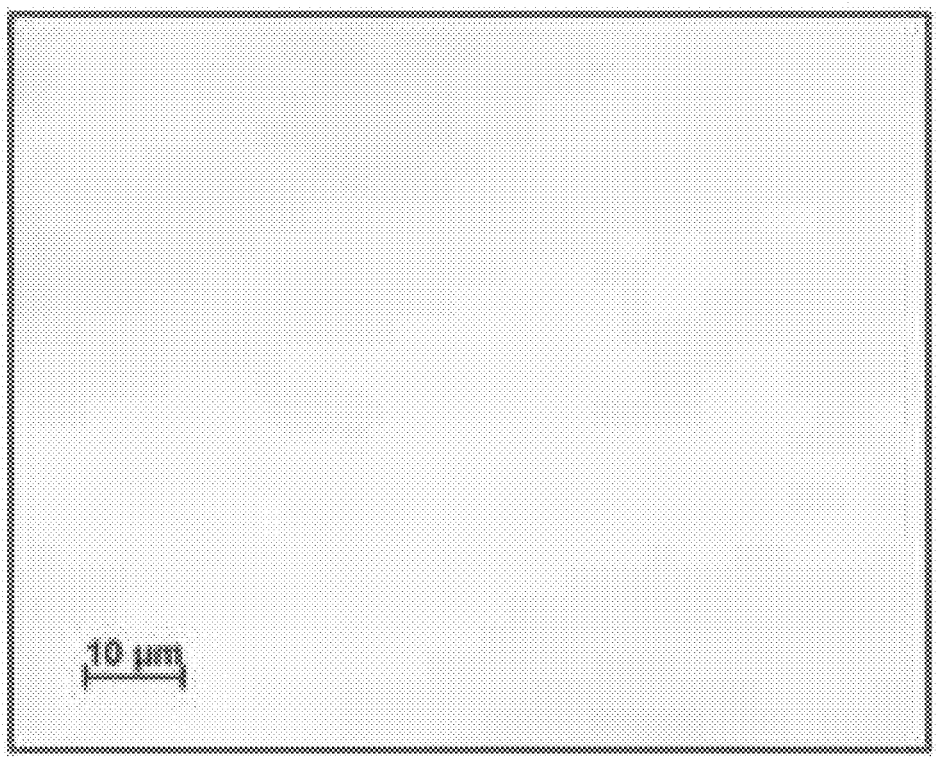
FIG. 16 is a polarizing microscopic image of the LCD panel according to Example 3 under the orthogonal polarizer after photo-stabilization by UV light irradiation and after application of a voltage of 2.5 V.
Figure 17:
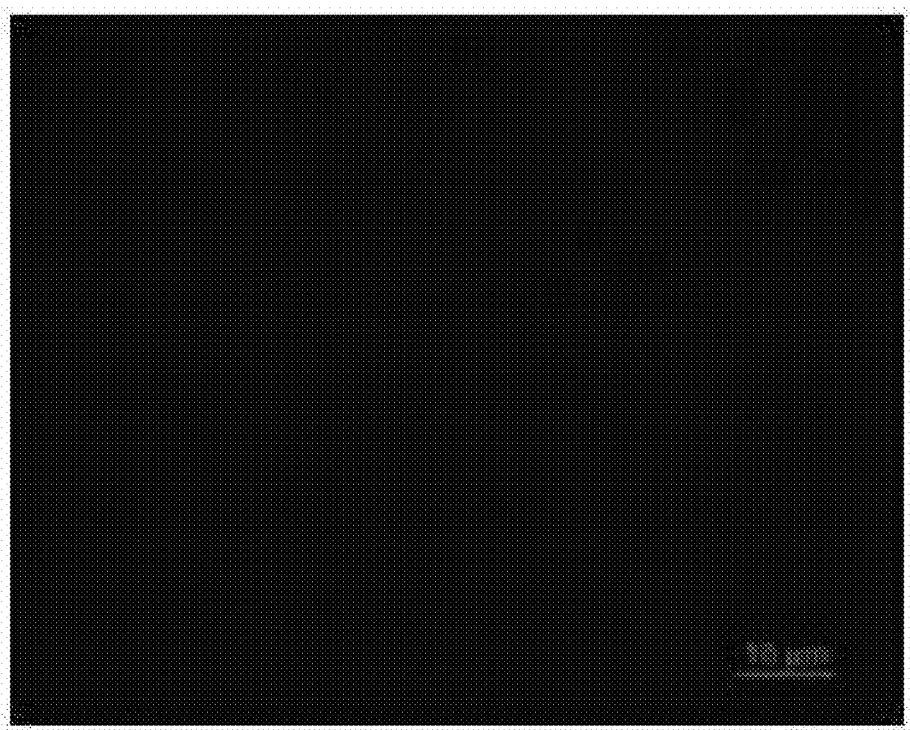
FIGS. 17 through 19 are polarizing microscopic images of changes in the transmittance of an LCD panel according to Example 4 with respect to voltage applied before photo-stabilization.

When a voltage of 2.5 V was applied in an initial dark (black) state as shown in FIG. 15, the arrangement state of the liquid crystals was changed as the liquid crystals reacted to the voltage. Accordingly, optical axes of the liquid crystals formed an angle of 45 degrees with a transmission axis of a polarizer on the substrate surface. As a result, the dark state was changed directly to a bright state as shown in FIG. 16 without the generation of liquid crystal arrangement defects. This is a phenomenon resulting from surface stabilization of the alignment of liquid crystals achieved when a photoreactive group contained in the surface of the fine particles, which induced vertical alignment of the liquid crystals, caused the liquid crystal molecules to form a pretilt angle in a particular direction on the surface inside the cell in the UV irradiation process. The surface stabilization improved response speed of the liquid crystals and enhanced brightness and contrast ratio of the device.

EXAMPLE 4

Fine silica particles were surface-modified in the same way as in Example 1, except that a mixture of trimethoxy pentyl silane and trimethoxysilylpropyl methacrylate in a ratio of 1:1 by mol was used as a compound for surface modification. In addition, a liquid crystal device was manufactured in the same way as in Example 3, and then electro-optic characteristics of the liquid crystal device were evaluated.

As a result, it was found that vertical alignment of liquid crystals was induced by the fine particles surface-modified by the photoreactive compound and the liquid crystal-affinitive compound. It was also found that photo-stabilization under the application of an electric field removed generation of defects and increased response speed. That is, alignment stabilization improved the electro-optic characteristics of the device.

Figure 18:
Figure 19:
Figure 20:
FIGS. 20 and 21 are polarizing microscopic images of changes in the transmittance of the LCD panel according to Example 4 with respect to voltage applied after photo-stabilization.

Turning now to FIGS. 17-20, FIGS. 17 and 20 are polarizing microscopic images of an initial liquid crystal alignment state before and after photo-stabilization. It was observed from the images that good vertical alignment was obtained. However, switching characteristics of liquid crystals greatly changed in response to voltage application. FIGS. 18 and 19 are polarizing microscopic images of the device over time in response to voltage application before photo-stabilization. When a voltage of 2.4 V was applied to the device in an initial dark state (see FIG. 17), a high density of defects was generated as shown in FIG. 18. The defects gradually disappeared over time to produce a relatively uniformly bright state as shown in FIG. 19.

Figure 21:
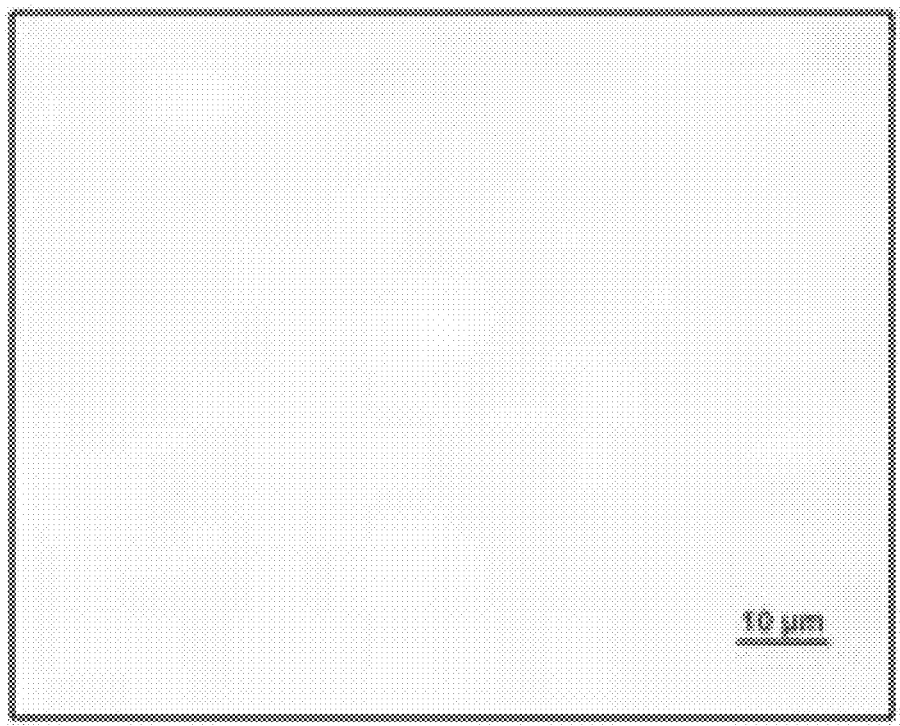

However, the device showed different switching characteristics after photo-stabilization. When a voltage of 2.4 V was applied to the device in the initial dark state (see FIG. 20) after photo-stabilization, the device rapidly switched to a bright state as shown in FIG. 21 without generation of any of the high density of defects of FIG. 18. This was because a surface pretilt angle was formed after photo-stabilization. That is, after photo-stabilization, a pretilt angle was induced and stabilized in a particular direction by the photoreactive fine particles. In addition, the formation of the pretilt angle significantly improved the electro-optic characteristics of the device.

EXAMPLE 5

Spherical fine silica particles having a diameter of 138 nm were surface-modified in the same way as in Example 1 except that trimethoxysilylpropyl methacrylate was used as a compound for surface modification. In addition, a liquid crystal device was manufactured in the same way as in Example 4 except that an electrode patterned with fine slits in the form of a fishbone was used and that a cell gap was 3.5 μm. Then, alignment characteristics and alignment stabilization characteristics of liquid crystals were evaluated.

Figure 22:
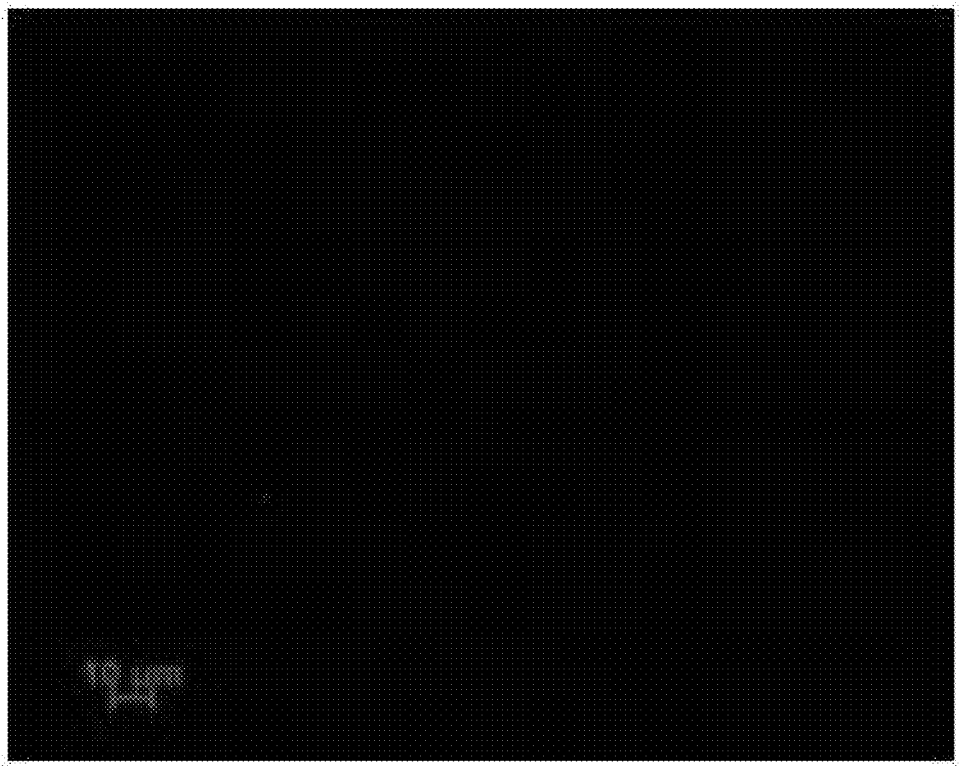
FIG. 22 is a polarizing microscopic image of an LCD panel according to Example 5 under an orthogonal polarizer after photo-stabilization by UV light irradiation and before voltage application.

The LCD manufactured thusly was observed using a polarizing microscope, and the result is shown in FIG. 22. As shown in FIG. 22, a liquid crystal cell of the manufactured LCD was in a complete light extinction state under an orthogonal polarizer, and liquid crystal molecules were arranged vertically to the substrate surface in a conoscopic image. In addition, an electric field was applied to the LCD at an intensity corresponding to T80 (80% of maximum transmittance), and then the alignment of the liquid crystal molecules was observed.

Generally, a liquid crystal cell aligned vertically to a substrate is in a light extinction state under an orthogonal polarizer as shown in FIG. 22. In this state, if an electric field is applied to the liquid crystal cell, liquid crystal molecules rotate in a direction perpendicular to the electric field, thereby increasing transmittance. However, if the liquid crystal molecules do not form a pretilt angle in a particular direction, they rotate in a random direction in each part of the liquid crystal cell. This causes a lot of liquid crystal arrangement defects, thus degrading characteristics of the LCD device. However, it was observed that defects generated at the initial stage of voltage application slowly disappeared over time to produce a uniformly bright state in each of four domains into which a pixel was split by the electrode patterned with fine slits (branches).

Figure 23:
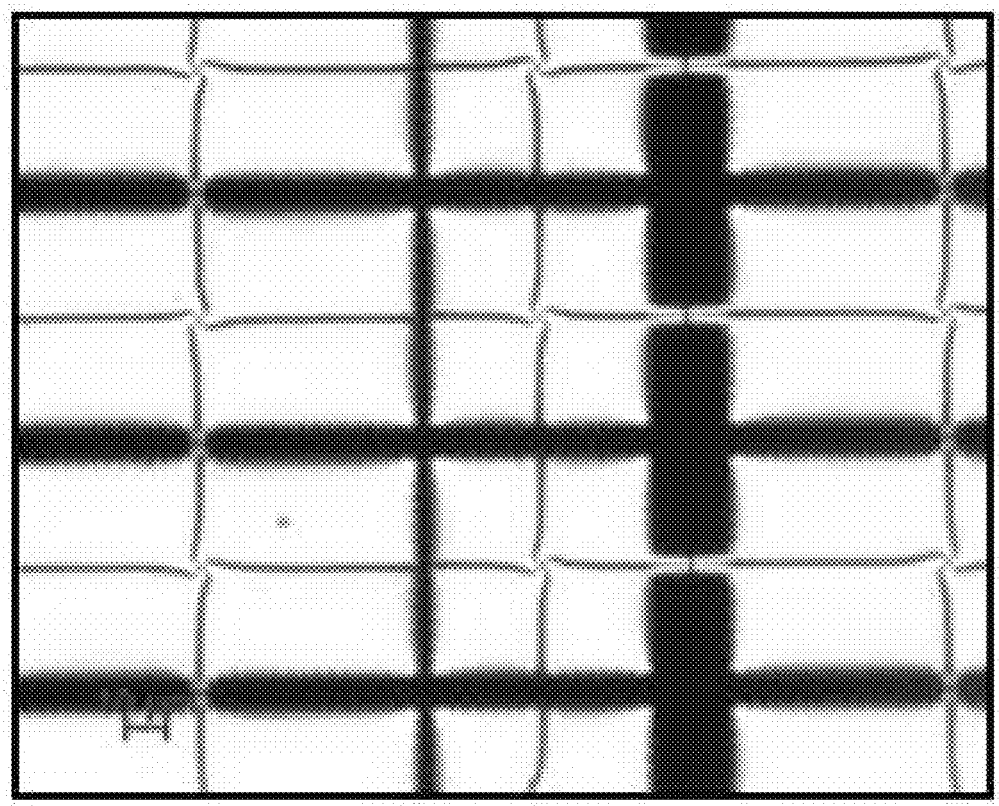
FIG. 23 is a polarizing microscopic image of the LCD panel according to Example 5 under the orthogonal polarizer after photo-stabilization by UV light irradiation and after application of a voltage of 3.4 V.

Additionally, in the uniformly bright state in each of the four domains, UV light having a wavelength of 365 nm was irradiated at an intensity of 1.0 mW/cm² for 30 minutes, and then electro-optic characteristics of the liquid crystal device were observed. When a voltage of 2.5 V was applied in an initial dark (black) state as shown in FIG. 22, the arrangement state of the liquid crystals was changed as the liquid crystals reacted to the voltage. Accordingly, optical axes of the liquid crystals formed an angle of 45 degrees with a transmission axis of a polarizer on the substrate surface in the pixel split into the four domains. As a result, the dark state was changed directly to a bright state as shown in FIG. 23 without generation of liquid crystal arrangement defects.

This is a phenomenon resulting from surface stabilization of the alignment of liquid crystals achieved when a photoreactive group contained in the surface of the fine particles, which induced vertical alignment of the liquid crystals, caused the liquid crystal molecules to form a pretilt angle in a particular direction on the surface inside the cell upon the light irradiation process. The surface stabilization improved response speed of the liquid crystals and enhanced brightness and contrast ratio of the device.

Figure 24:
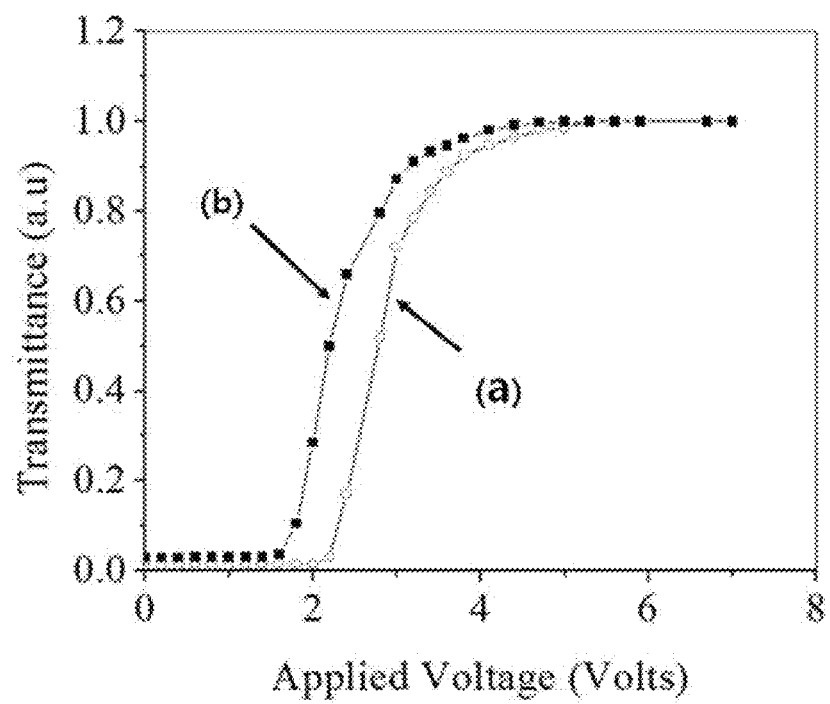
FIG. 24 is a graph illustrating the transmittance of the LCD panel according to Example 5 with respect to the applied voltage before and after photo-stabilization by UV light irradiation (graph a represents transmittance before photo-stabilization, and graph b represents transmittance after photo-stabilization).

Turning now to FIG. 24, FIG. 24 compares transmittance curves with respect to the applied voltage before and after alignment stabilization by light irradiation. As apparent from FIG. 24, alignment stabilization achieved by light irradiation improves electro-optic characteristics of a liquid crystal device (graph a represents transmittance before photo-stabilization, and graph b represents transmittance after photo-stabilization).

It can be understood from the above comparison that alignment stabilization achieved by light treatment removes generation of defects and increases response speed, thus improving the electro-optic characteristics of the liquid crystal device.

EXAMPLE 6

Spherical poly(methylmethacrylate) (PMMA) particles having a diameter of 100 nm and surface-modified with a carboxyl group (—COOH) were made to react with 6-hydroxyhexyl acrylate to separate and refine fine polymer particles surface-modified with hexyl acrylate as in Example 3.

0.03 parts by weight of the surface-modified and dried photoreactive fine polymer particles were evenly dispersed in 100 parts by weight of a liquid crystal mixture having negative dielectric anisotropy. Then, 0.1 parts by weight of photoreactive mesogen (RM 257 of Merck & Co., Inc.) were added to the resultant mixture to produce a liquid crystal composition.

A liquid crystal device was manufactured by injecting the liquid crystal composition into a liquid crystal cell that included two substrates untreated with an alignment agent and maintained at a gap of 10.0 μm therebetween. Then, alignment characteristics and alignment stabilization characteristics of liquid crystals were evaluated in the same way as in Example 5.

As a result, it was observed from polarizing microscopic and conoscopic images that when the mixture of the liquid crystals, the photoreactive mesogen, and the fine particles was injected into the cell, vertical alignment of the liquid crystals was induced without an alignment layer formation process.

In addition, an electric field was applied to the LCD at an intensity corresponding to T80 (80% of maximum transmittance), and then the alignment of the liquid crystal molecules was observed. As in Example 5, a lot of liquid crystal arrangement defects were generated at the initial stage of electric field application because the liquid crystal molecules did not form a pretilt angle in a particular direction. However, the defects slowly disappeared over time to produce a uniformly bright state.

Additionally, in the uniformly bright state, UV light having a wavelength of 365 nm was irradiated at an intensity of 1.0 mW/cm² for 30 minutes, and then electro-optic characteristics of the liquid crystal device were observed. As a result, it was found that surface stabilization of the alignment of the liquid crystals was achieved because a photoreactive group bonded to the surface of the fine particles, which induced vertical alignment of the liquid crystals, and caused the liquid crystal molecules to form a pretilt angle in a particular direction on the surface of the substrates inside the cell upon the light irradiation process. The surface stabilization improved the electro-optic characteristics of the liquid crystal device.

While the present invention has been particularly shown and described with reference to exemplary embodiments and examples thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display (LCD) panel, comprising:
   an upper substrate facing a lower substrate;
   a liquid crystal cell arranged between the upper substrate and the lower substrate, the liquid crystal cell comprising liquid crystals;
   an electric field generating electrode disposed between the liquid crystal cell and at least one of the upper substrate and the lower substrate; and
   a liquid crystal alignment layer arranged between the liquid crystal cell and the electric field generating electrode,
   wherein the liquid crystal alignment layer is vertically aligning and consists essentially of:
   a plurality of spherical or spherical-like core particles having a diameter of 10 nm to 1 μm, each being represented by formula (1) below,

P—X—R,     (1)

wherein P is the spherical or spherical-like core particle having a surface introduced with at least one electron pair donor, X is at least one linker, and R is a $C_3$-$C_{30}$ saturated or unsaturated hydrocarbon bonded to the core particle by the linker, and a photopolymerization functional group that is polymerized by light and is bonded to the $C_3$-$C_{30}$ saturated or unsaturated hydrocarbon, wherein the plurality of core particles are disposed directly on and adhered without an intervening layer to the electric field generating electrode, and wherein the photopolymerization functional group is configured to stabilize an alignment of the liquid crystals by pretilting the liquid crystals.

2. The LCD panel of claim 1, wherein the core particles each have a diameter of 10 to 500 nm.

3. The LCD panel of claim 2, wherein the core particles each have a diameter of 10 to 200 nm.

4. The LCD panel of claim 1, wherein the core particles are comprised of one of an inorganic oxide and an organic polymer compound.

5. The LCD panel of claim 4, wherein the inorganic oxide is comprised of one of silicon oxide, silica and aluminum oxide, and the organic polymer compound is comprised of one of polystyrene, polymethyl methacrylate, and polyacrylate.

6. The LCD panel of claim 1, wherein the electron-pair donor is comprised of at least one functional group selected from a group consisting of hydroxyl group (—OH), an amine group (—N, —NH, —$NH_2$), a thiol group (—SH), an aldehyde group (—COH), and a carboxyl group (—COOH).

7. The LCD panel of claim 1, wherein the photopolymerization functional group is comprised of a functional group selected from a group consisting of an acryl group, a methacryl group, a cinnamate group, a cinnamamide group, a maleimide group, a coumarin group, an ene group (—C=C—), a diene group, a thiol-ene group, a chalcone group, and combinations of the same.

8. The LCD panel of claim 1, wherein the at least one linker is selected from a group consisting of Si, —C=O—, —COO—, —($SO_2$)—, —O($SO_2$)—, —O($SO_2$)O—, —(P=O)$O_2$— and —O(P=O)$O_2$—.

9. The LCD panel of claim 1, wherein the photopolymerization functional group is selected from a group consisting of an acryl group, a methacryl group, a cinnamate group, a coumarin group, a vinyl group, a thiol group, an ene group, a diene group, a thiol-ene group, an acetylene group, an acryloxy group, a methacryloxy group, and combinations of the same.

10. A method of manufacturing an LCD panel, comprising:

placing an upper substrate and a lower substrate to face each other;

forming a liquid crystal composition that includes a plurality of liquid crystals and a plurality of precursor particles represented by formula (1) below,

  (1)

wherein P is a spherical or spherical-like core particle having a diameter of 10 nm to 1µm and having a surface introduced with at least one electron pair donor selected from a group consisting of a hydroxyl group (—OH), an amine group (—N, —NH, —$NH_2$), a thiol group (—SH), an aldehyde group (—COH) and a carboxyl group (—COOH), X being at least one linker selected from a group consisting of Si, —C=O—, —COO—, —($SO_2$)—, —O($SO_2$)—, —O($SO_2$)O—, —(P=O)$O_2$— and —O(P=O)$O_2$—, and R being a saturated or an unsaturated hydrocarbon including 3 to 30 carbon atoms;

injecting the liquid crystal composition between the upper and the lower substrates;

irradiating the liquid crystal composition with ultraviolet radiation while applying an electric field to the liquid crystal composition after the injecting, and hence forming a liquid crystal cell comprising liquid crystals arranged between the upper substrate and the lower substrate, and a vertically aligning liquid crystal alignment layer consisting essentially of the plurality of spherical or spherical-like core particles disposed directly on, and adhered without an intervening layer to an electric field generating electrode disposed between the liquid crystal cell and at least one of the upper substrate and the lower substrate, wherein the (R) saturated or unsaturated hydrocarbon including 3 to 30 carbon atoms is substituted by a photopolymerization functional group which is configured to stabilize an alignment of the liquid crystals by pretilting the liquid crystals.

11. The method of claim 10, wherein the photopolymerization functional group is selected from a group consisting of an acryl group, a methacryl group, a cinnamate group, a coumarin group, a vinyl group, a thiol group, an ene group, a diene group, a thiol-ene group, an acetylene group, an acryloxy group, a methacryloxy group, and combinations of the same.

* * * * *